Sept. 24, 1957    J. R. HOLLOWELL ET AL    2,807,496
MOTOR VEHICLE WHEELHOUSE CONSTRUCTION
Filed May 25, 1955

J. R. HOLLOWELL
A. W. MORRIS
INVENTORS

BY

ATTORNEYS

United States Patent Office 2,807,496
Patented Sept. 24, 1957

2,807,496

MOTOR VEHICLE WHEELHOUSE CONSTRUCTION

John R. Hollowell, Dearborn, and Avery W. Morris, Birmingham, Mich., assignors to Ford Motor Company, Dearborn, Mich., a corporation of Delaware Application May 25, 1955, Serial No. 510,959

4 Claims. (Cl. 296—1)

This invention relates generally to a motor vehicle body construction, and has particular reference to a body construction in which additional clearance is provided in the rear storage compartment adjacent the wheelhouse.

In certain types of motor vehicle bodies space within the rear storage compartment at opposite sides thereof is at a premium. For example, in a convertible type of body the top linkage stacks into the rear storage compartment of the vehicle at opposite sides thereof when the top is lowered. Space in these areas is extremely limited because the wheelhouses for the rear wheels project bodily into the storage compartment. A similar situation exists in connection with vehicles of the type in which a rigid top is retracted into the rear storage compartment of the vehicle, since components of the top must be positioned adjacent the wheelhouse areas. The wheel size and location is determined by several factors. It must provide clearance for the maximum wheel jounce, that is the extreme rising movement of the rear wheel relative to the vehicle resulting from road bumps or from vehicle cornering. In addition, the wheelhouse must provide clearance for tire chains, and this clearance must be added to the wheel jounce clearance. It is an object of the present invention to provide a body construction in which additional space is available in the rear storage compartment for vehicle components, yet in which adequate clearance is available in the wheelhouse when required by extreme wheel jounce and the use of tire chains.

In an embodiment of the invention the foregoing object is accomplished by providing an opening in the wheelhouse in the zone of possible interference with vehicle components such as a retractable top or convertible top linkage. This opening is covered by a flexible rubber boot, suitably attached to the wheelhouse adjacent the marginal edges of the opening. The flexibility of the boot permits it to be deformed downwardly to provide additional clearance above the wheelhouse for the interfering vehicle components. The projection of the boot into the wheelhouse at this time is not objectionable since tire chains would not normally be used when the retractable or convertible top of the vehicle is lowered. On the other hand, when tire chains are used in the winter, the top would be raised and the flexible rubber boot could be deformed upwardly to provide the necessary clearance in the wheelhouse.

A further object of the invention is to provide a boot of the type discussed above in which the central portion of the boot may be snapped from a concave position on one side of the plane of the wheelhouse opening to a similar position on the opposite side thereof, the movement across the center plane being initiated by the engagement of the boot by either the vehicle top components or by the tire chains, as the case may be.

Still another object of the invention is to provide a vehicle body construction permitting the height of the rear storage compartment to be lowered without detracting from the available critical space within the compartment for vehicle top components. This is accomplished by a construction enabling space adjacent the wheelhouse to be alternately used for wheel and chain clearance and for clearance for the top components. Thus, a portion of the wheelhouse has a dual purpose.

Other objects and advantages of this invention will be made more apparent as this description proceeds, particularly when considered in connection with the accompanying drawings, wherein.

Figure 1:
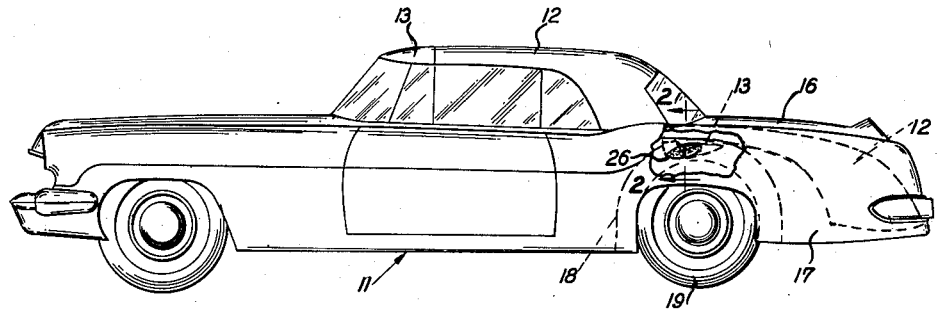
Figure 1 is a side elevational view of a motor vehicle body, partly broken away to illustrate the present invention.

Referring now to the drawings, the reference character 11 indicates generally a motor vehicle body, in this instance shown as being of the retractable hardtop type such as disclosed in the copending application of J. R. Hollowell, B. J. Smith, and R. T. Butler, for "Vehicle Body Construction," filed September 20, 1954, under Serial No. 456,994, and having a common assignee with the present application. The body 11 has a roof 12 the forward portion 13 of which is adapted to be folded back to enable the roof to be bodily moved into the storage compartment 14 provided beneath the rear deck lid 16. In its stored position the forward portion 13 of the roof 12 occupies a position such as shown in dotted lines in Figure 2.

Concealed by the quarter panel 17 is a sheet metal wheelhouse 18 for the rear road wheel 19. The wheelhouse 19 is conventionally formed of an outer sheet metal section 21 and an inner sheet metal section 22 having their juxtaposed flanges suitably welded together to form a unit. In cross section the wheelhouse is shaped generally as an inverted U, and sufficient clearance is provided between the upper portion of the wheelhouse and the rear wheel 19 to accommodate wheel movement and also tire chains.

Figure 2:
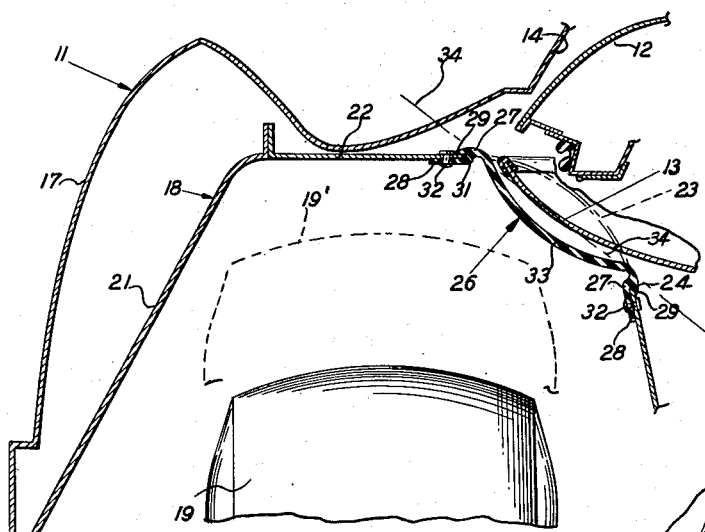
Figure 2 is an enlarged vertical transverse cross sectional view taken on the plane indicated on the line 2—2 of Figure 1.
Figure 3:
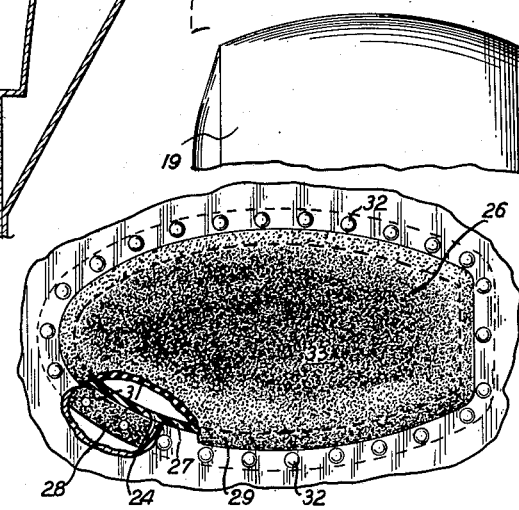
Figure 3 is an elevational view of the wheelhouse shown in Figure 2 looking in the direction of the flexible boot, and partly broken away and in section.
Figure 4:
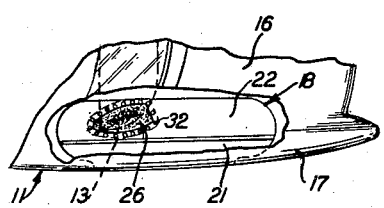
Figure 4 is a fragmentary plan view of a portion of vehicle body, partly broken away to show the present invention.

The normal position of the rear wheel 19 is shown in Figure 2 in full lines with the dotted line position 19′ indicating the position of the wheel during full jounce, or maximum upward movement of the wheel relative to the vehicle body. In addition to providing sufficient clearance for full wheel jounce, the wheelhouse must provide clearance for tire chains which may be fitted to the tire during winter conditions. These clearances are cumulative since it is possible that full jounce conditions might be encountered when tire chains are in use. The dotted line 23 indicates the normal contour of the upper portion of the wheelhouse 18 designed to provide the proper clearance for wheel jounce and tire chains.

It will be noted that an interference would normally exist between the normal wheelhouse contour 23 and the lowered position of the forward portion 13 of the vehicle roof 12. While of course this interference could be eliminated by raising the rear deck lid 16 so as to provide additional space within the rear storage compartment 14, it is desirable to maintain certain heights for styling considerations.

An elongated opening 24 is formed in the uper portion of the inner wheelhouse section 22 adjacent the zone of interference with the roof section 13. While this opening can obviously be so located and of such shape as to accommodate the interfering components of the vehicle roof, in this particular instance it is shown as being located on the upper portion of the wheelhouse just forwardly of the center thereof, and is of an elongated oval shape. This opening is covered by means of a flexible rubber boot 26. The boot 26 is preferably molded and has a thickened peripheral portion 27 bifurcated to form inner and outer marginal flanges 28 and 29 respectively. The flange 28 is wider than the flange 29, and the flanges are spaced to form a peripheral groove 31 therebetween.

The boot 26 is assembled to the wheelhouse by engaging the peripheral groove 31 with the marginal portions of the wheelhouse adjacent the opening 24, so that the wide inner flange 28 of the boot engages the inner side of the wheelhouse and the narrow outer flange 29 engages the outer side thereof. A series of large headed rivets 32 are spaced at close intervals around the periphery of the boot and extend through the wide flange 28 and the adjacent portion of the wheelhouse to secure the boot thereto. The rubber boot 26 may be formed in several ways. For example, it may have a central flat portion extending across the opening 24 in the wheelhouse, or, as shown in Figure 2, it may be of concave dished shape so as to be located on one side of the central plane 34 of the covered opening 24.

With the central dished portion 33 of the rubber boot 24 extending into the normal wheelhouse area, as shown in Figure 2, clearance is provided above the boot for the forward section 13 of the retractable roof 12 when the latter is lowered. With this arrangement it has been found possible to lower the retracted position of the roof and consequently the height of the rear deck lid 16.

Although the inwardly dished central section 33 of the flexible rubber boot 26 projects into the wheelhouse, it does not interfere with normal rising and falling movements of the vehicle wheel relative to the vehicle body. In other words, the full jounce position 19' of the rear wheel does not result in interference between the wheel and the boot. The use of tire chains, which must be allowed for in design considerations, will, however, result in interference between the tire chains and the central portion of the boot during full jounce. Since, however, chains will normally only be used during winter conditions, and at this time the retractable roof will be raised, the flexible rubber boot 26 may be readily deformed upwardly to accommodate the tire chains. While these extreme conditions only occur occasionally, as for example during winter chain operation over extremely rough roads or in cornering, nevertheless provision must be made for such conditions.

If desired, the boot 26 may be formed in such manner that the central portion 33 thereof is adapted to snap from the downwardly dished position shown in Figure 2 below the plane 34 of the wheelhouse opening to an upwardly dished position generally along the dotted lines 23. With this type of boot, engagement of the central portion of the boot by the section 13 of the roof will snap the boot to the downward position where it will remain until returned to its upper position by engagement of the boot by the tire chain. This arrangement eliminates wear which might result from repeated engagement between the boot and the tire chains.

Although shown in connection with a vehicle having a rigid retractable roof, the invention is also applicable to vehicles of the convertible type in which clearance for the top linkage is often at a premium.

It will be understood that the invention is not to be limited to the exact construction shown and described, but that various changes and modifications may be made without departing from the spirit and scope of the invention, as defined in the appended claims.

What is claimed is:

1. In a motor vehicle having rear road wheels, a vehicle body having a rear storage compartment located intermediate the rear road wheels, a sheet metal wheelhouse surrounding the upper portion of each of the rear road wheels, each wheelhouse being generally shaped in cross section as an inverted U and spaced from the adjacent road wheel a distance sufficient to provide clearance for rising movement of the wheel relative to the vehicle plus clearance for tire chains, one wheelhouse having an elongated opening in its upper portion, a flexible rubber boot covering the opening in said wheelhouse and overlapping the adjacent marginal edges of said wheelhouse, and fastening means securing the edges of said boot to said wheelhouse, said boot being deformable to provide additional space in said storage compartment and to provide clearance for the rising movement of said road wheel and said tire chains.

2. The structure defined by claim 1 which is further characterized in that said rubber boot is preformed into a dished shape to normally extend into the usual wheelhouse space and provide additional clearance in the storage compartment immediately adjacent the upper portion of said wheelhouse yet be deflectable upwardly to provide normal wheel clearance in the wheelhouse when required.

3. The structure defined by claim 1 which is further characterized in that said rubber boot has a central portion concavely dished and extending on one side of the plane of the opening of said wheelhouse, said rubber boot being deformable when engaged by a vehicle component to snap from its initial position to a second dished position on the opposite side of the plane of said opening.

4. In a motor vehicle having rear road wheels, a vehicle body having a rear storage compartment, a sheet metal wheelhouse surrounding the upper portion of each of the rear road wheels, one wheelhouse having an opening in its upper portion, a flexible rubber boot covering the opening in said wheelhouse and secured adjacent its marginal edges to said wheelhouse, said boot being deformable inwardly of the wheelhouse to provide additional space in said storage compartment and being deformable outwardly of the wheelhouse to provide additional clearance within the wheelhouse for the road wheel.

References Cited in the file of this patent

UNITED STATES PATENTS

| | | |
|---|---|---|
| 2,017,227 | Barnhart | Oct. 15, 1935 |
| 2,234,781 | Schjolin | Mar. 11, 1941 |
| 2,606,625 | Paton | Aug. 12, 1952 |